United States Patent
Uchida et al.

(10) Patent No.: US 10,745,593 B2
(45) Date of Patent: Aug. 18, 2020

(54) PRESSURE-SENSITIVE ADHESIVE TAPE, PRESSURE-SENSITIVE ADHESIVE TAPE FOR AFFIXING COMPONENT FOR ELECTRONIC APPLIANCE, AND TRANSPARENT PRESSURE-SENSITIVE ADHESIVE TAPE FOR OPTICAL USE

(71) Applicant: SEKISUI CHEMICAL CO., LTD., Osaka (JP)

(72) Inventors: Noriyuki Uchida, Shiga (JP); Yasushi Ishido, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 56 days.

(21) Appl. No.: 16/065,898

(22) PCT Filed: Feb. 27, 2017

(86) PCT No.: PCT/JP2017/007536
§ 371 (c)(1),
(2) Date: Jun. 25, 2018

(87) PCT Pub. No.: WO2017/150463
PCT Pub. Date: Sep. 8, 2017

(65) Prior Publication Data
US 2019/0010366 A1 Jan. 10, 2019

(30) Foreign Application Priority Data

Mar. 2, 2016 (JP) ................................. 2016-040231
Apr. 15, 2016 (JP) ................................. 2016-082276
Oct. 24, 2016 (JP) ................................. 2016-207899

(51) Int. Cl.
| | |
|---|---|
| C09J 133/16 | (2006.01) |
| C09J 133/08 | (2006.01) |
| C08F 220/22 | (2006.01) |
| C08F 220/24 | (2006.01) |
| C09J 7/38 | (2018.01) |
| C09J 7/10 | (2018.01) |
| C08F 220/18 | (2006.01) |
| C08F 220/12 | (2006.01) |

(52) U.S. Cl.
CPC ............ *C09J 7/385* (2018.01); *C08F 220/12* (2013.01); *C08F 220/18* (2013.01); *C08F 220/22* (2013.01); *C08F 220/24* (2013.01); *C09J 7/10* (2018.01); *C09J 133/08* (2013.01); *C09J 133/16* (2013.01); *C08F 2800/20* (2013.01); *C09J 2201/622* (2013.01); *C09J 2203/326* (2013.01); *C09J 2205/114* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 8,168,704 | B2 * | 5/2012 | Ogawa | C09J 133/06 |
| | | | | 524/81 |
| 2007/0141330 | A1 * | 6/2007 | Morishima | H01L 21/6835 |
| | | | | 428/343 |
| 2014/0087114 | A1 * | 3/2014 | Ito | G11B 7/256 |
| | | | | 428/65.1 |

FOREIGN PATENT DOCUMENTS

| | | |
|---|---|---|
| JP | 64-66283 | 3/1989 |
| JP | 4-68074 | 3/1992 |
| JP | 7-286145 | 10/1995 |
| JP | 2005-213455 | 8/2005 |
| JP | 2014-065775 | 4/2014 |
| JP | 2015-17207 | 1/2015 |
| JP | 2015-021067 | 2/2015 |
| JP | 2015-052050 | 3/2015 |
| JP | 2015-120876 | 7/2015 |
| JP | 6043240 B2 * | 12/2016 |
| WO | WO-2016089687 A1 * | 6/2016 ............ C08F 220/14 |

OTHER PUBLICATIONS

Abstract of JP 6043240B2, 2016 (Year: 2016).*
International Search Report dated Apr. 4, 2017 in International Application No. PCT/JP2017/007536.

* cited by examiner

*Primary Examiner* — Nicole M. Buie-Hatcher
(74) *Attorney, Agent, or Firm* — Wenderoth, Lind & Ponack, L.L.P.

(57) ABSTRACT

The present invention aims to provide an adhesive tape excellent in resistance against sebum to be able to maintain its adhesive force even when applied to a part frequently touched with human hands, and an adhesive tape for fixing electronic device component and a transparent adhesive tape for optical use each provided with the adhesive tape. The present invention relates to an adhesive tape including an adhesive layer containing an acrylic adhesive, the adhesive layer having a swelling ratio of 100% or more and 130% or less after immersion in oleic acid under the conditions of a temperature of 60° C. and a humidity of 90% for 24 hours.

7 Claims, No Drawings

PRESSURE-SENSITIVE ADHESIVE TAPE, PRESSURE-SENSITIVE ADHESIVE TAPE FOR AFFIXING COMPONENT FOR ELECTRONIC APPLIANCE, AND TRANSPARENT PRESSURE-SENSITIVE ADHESIVE TAPE FOR OPTICAL USE

TECHNICAL FIELD

The present invention relates to an adhesive tape excellent in resistance against sebum to be able to maintain its adhesive force even when applied to a part frequently touched with human hands, and an adhesive tape for fixing electronic device component and a transparent adhesive tape for optical use each provided with the adhesive tape.

BACKGROUND ART

Conventionally, adhesive tapes have been widely used for fixation of components in electronic devices. Specifically, for example, adhesive tapes are used to bond a cover panel for protecting a surface of a portable electronic device to a touch panel module or display panel module and to bond a touch panel module to a display panel module. Adhesive tapes used for such electronic device component fixation are required to have, in addition to high adhesiveness, various properties such as heat resistance, heat conductivity, and impact resistance according to an environment of a part where the adhesive tapes are applied (see Patent Literatures 1 to 3).

Along with the recent reduction in size and weight of electronic devices and cost reduction, electronic devices that can be always carried on the body or kept at hand, such as mobile phones, smartphones, and wearable terminals, are widely spread. Such portable electronic devices are often used and operated by a touch panel or the like with bare hands. Therefore, in the case where an adhesive tape is used at a part frequently touched with hands, the adhesive tape may be deteriorated due to sebum to peel off.

CITATION LIST

Patent Literature

Patent Literature 1: JP 2015-052050 A
Patent Literature 2: JP 2015-021067 A
Patent Literature 3: JP 2015-120876 A

SUMMARY OF INVENTION

Technical Problem

The present invention aims to provide an adhesive tape excellent in resistance against sebum to be able to maintain its adhesive force even when applied to a part frequently touched with human hands, and an adhesive tape for fixing electronic device component and a transparent adhesive tape for optical use each provided with the adhesive tape.

Solution to Problem

The present invention relates to an adhesive tape including an adhesive layer containing an acrylic adhesive, the adhesive layer having a swelling ratio of 100% or more and 130% or less after immersion in oleic acid under the conditions of a temperature of 60° C. and a humidity of 90% for 24 hours.

The present invention is specifically described in the following.

The present inventors intensively studied about the peeling of an adhesive due to sebum to find out that the use of an acrylic adhesive having a swelling ratio falling within a specific range after immersion in oleic acid allows maintenance of the adhesive force even when the adhesive is exposed to sebum. Thus, the present invention was completed.

The adhesive tape of the present invention includes an adhesive layer containing an acrylic adhesive. The adhesive layer has a swelling ratio of 100% or more and 130% or less after immersion in oleic acid under the conditions of a temperature of 60° C. and a humidity of 90% for 24 hours.

With the oleic acid swelling ratio of the adhesive layer falling within the above range, the adhesive tape of the present invention exhibits high resistance against deterioration due to oleic acid that is a main component of sebum and can prevent peeling thereof even when applied to a part frequently touched with human hands. The upper limit of the oleic acid swelling ratio is preferably 120%, more preferably 110%.

The term "swelling ratio" as used herein refers to a value in percentage of the ratio of the weight of the adhesive after immersion in oleic acid to the weight of the adhesive before immersion in oleic acid as shown by the following equation:

Swelling ratio (% by weight)=(Weight of adhesive after immersion in oleic acid/Weight of adhesive before immersion in oleic acid)×100.

An acrylic adhesive layer having an oleic acid swelling ratio falling within the above range can be obtained, for example, by a method of using a (meth)acrylate copolymer in an acrylic adhesive. Specifically, a method (1) of using an acrylic adhesive containing a (meth)acrylate copolymer containing a constitutional unit derived from a fluorine-containing (meth)acrylate can be exemplified. Another employable method is a method (2) of using an acrylic adhesive containing a (meth)acrylate copolymer containing a constitutional unit derived from a (meth)acrylate having an alkyl group with a carbon number of 2 or less. These two acrylic adhesives are described in the following. The term "(meth)acrylate" as used herein refers to acrylate or methacrylate.

(1) Acrylic Adhesive Containing a (Meth)Acrylate Copolymer Containing a Constitutional Unit Derived from a Fluorine-Containing (Meth)Acrylate The acrylic adhesive preferably contains a (meth)acrylate copolymer containing a constitutional unit derived from a fluorine-containing (meth)acrylate (hereafter, referred to as a fluorine-containing (meth)acrylate copolymer). The constitutional unit derived from a fluorine-containing (meth)acrylate can impart high resistance against sebum to the adhesive tape to be obtained because fluorine itself has high water and oil repellency and the molecular chain thereof is less likely to allow entrance of sebum thereinto due to dense packing of fluorine atoms. Even when the acrylic adhesive contains a fluorine-containing (meth)acrylate copolymer, the tackiness of the adhesive tape to be obtained can be maintained.

Examples of the fluorine-containing (meth)acrylate include 2,2,2-trifluoroethylacrylate, 2-(perfluorohexyl)ethylacrylate, 2,2,3,3,3-pentafluoropropylacrylate, 2-(perfluorobutyl)ethylacrylate, 3-perfluorobutyl-2-hydroxypropylacrylate, 3-perfluorohexyl-2-hydroxypropylacrylate, 3-(perfluoro-3-methylbutyl)-2-hydroxypropylacrylate, 1H,1H,3H-tetrafluoropropylacrylate, 1H,1H,5H-octafluoropentylacrylate, 1H,1H,7H-dodecafluoroheptylacrylate, 1H-1-(trifluoromethyl)trifluoroethylacrylate, 1H,1H,3H-hexafluorobutylacrylate, and 1,2,2,2-tetrafluoro-1-(trifluoromethyl)ethylacrylate. Preferred among these is 2,2,2-trifluoroethylacrylate because the resistance against sebum is especially high.

The lower limit of the amount of the constitutional unit derived from a fluorine-containing (meth)acrylate in the fluorine-containing (meth)acrylate copolymer is preferably 30% by weight and the upper limit thereof is preferably 99% by weight. With the amount of the constitutional unit derived from a fluorine-containing (meth)acrylate of 30% by weight or more, adjustment of the oleic acid swelling ratio within the above range is facilitated. With the amount of the constitutional unit derived from a fluorine-containing (meth) acrylate of 99% by weight or less, the adhesive is not too hard and can provide an adhesive tape with enhanced adhesive force. The lower limit of the amount of the constitutional unit derived from a fluorine-containing (meth) acrylate is more preferably 40% by weight and the upper limit thereof is more preferably 80% by weight, still more preferably 60% by weight.

The fluorine-containing (meth)acrylate copolymer preferably further contains a constitutional unit derived from a (meth)acrylate having an alkyl group with a carbon number of 2 or less. The fluorine-containing (meth)acrylate copolymer containing a constitutional unit derived from a (meth) acrylate having an alkyl group with a carbon number of 2 or less can have further enhanced resistance against sebum.

Examples of the (meth)acrylate having an alkyl group with a carbon number of 2 or less include methyl(meth) acrylate and ethyl(meth)acrylate. Preferred among these is ethyl acrylate because the adhesive is not too hard and can provide an adhesive tape with enhanced adhesive force.

The amount of the constitutional unit derived from a (meth)acrylate having an alkyl group with a carbon number of 2 or less in the fluorine-containing (meth)acrylate copolymer is not particularly limited. The lower limit of the amount is preferably 15% by weight and the upper limit thereof is preferably 40% by weight. With the amount of the (meth)acrylate having an alkyl group with a carbon number of 2 or less falling within the above range, the adhesive tape to be obtained can have further enhanced resistance against sebum. The lower limit of the amount of the constitutional unit derived from a (meth)acrylate having an alkyl group with a carbon number of 2 or less in the fluorine-containing (meth)acrylate copolymer is more preferably 20% by weight and the upper limit thereof is more preferably 30% by weight.

The fluorine-containing (meth)acrylate copolymer preferably further contains a constitutional unit derived from a monomer having a crosslinkable functional group.

When the fluorine-containing (meth)acrylate copolymer contains the constitutional unit derived from a monomer having a crosslinkable functional group, the use of a crosslinking agent in combination allows crosslinking between fluorine-containing (meth)acrylate copolymer chains. Adjustment of the degree of crosslinking at that time can adjust the gel fraction and the swelling ratio.

Examples of the crosslinkable functional group include hydroxy, carboxy, glycidyl, amino, amide, and nitrile groups. Preferred among these are hydroxy and carboxy groups because the gel fraction of the adhesive layer is easily adjusted. Examples of the monomer having a hydroxy group include (meth)acrylic acid esters having a hydroxy group such as 4-hydroxybutyl(meth)acrylate and 2-hydroxyethyl (meth)acrylate.

Examples of the monomer having a carboxy group include (meth)acrylic acid.

Examples of the monomer having a glycidyl group include glycidyl (meth)acrylate.

Examples of the monomer having an amide group include hydroxyethylacrylamide, isopropylacrylamide, and dimethylaminopropylacrylamide.

Examples of the monomer having a nitrile group include acrylonitrile. These monomers having a crosslinkable functional group may be used alone or in combination of two or more thereof.

The amount of the constitutional unit derived from a monomer having a crosslinkable functional group in the fluorine-containing (meth)acrylate copolymer is not particularly limited. The lower limit thereof is preferably 1% by weight and the upper limit thereof is preferably 5% by weight. With the amount of the constitutional unit derived from a monomer having a crosslinkable functional group falling within the above range, adjustment of the swelling ratio and the gel fraction within the above ranges is facilitated.

The fluorine-containing (meth)acrylate copolymer may further contain a constitutional unit derived from propyl (meth)acrylate, butyl(meth)acrylate, cyclohexyl(meth)acrylate, octyl(meth)acrylate, nonyl(meth)acrylate, isobornyl (meth)acrylate, benzyl(meth)acrylate, phenoxyethyl(meth) acrylate, vinyl acetate, or the like, as long as the effect of the present invention is not impaired.

In the case where the fluorine-containing (meth)acrylate copolymer is prepared by a UV polymerization method, the fluorine-containing (meth)acrylate copolymer preferably further contains a constitutional unit derived from a polyfunctional monomer such as divinylbenzene or trimethyrolpropane tri(meth)acrylate.

The lower limit of the weight average molecular weight of the fluorine-containing (meth)acrylate copolymer is preferably 250,000. With the weight average molecular weight of the fluorine-containing (meth)acrylate copolymer of 250,000 or more, the adhesive tape to be obtained has further enhanced adhesive force and, as an acrylic adhesive layer having an oleic acid swelling ratio falling within the above range, is excellent in resistance against sebum to be able to maintain its adhesive force even when applied to a part frequently touched with human hands. The lower limit of the weight average molecular weight of the fluorine-containing (meth)acrylate copolymer is more preferably 400,000, still more preferably 500,000, particularly preferably 600,000. The upper limit of the weight average molecular weight of the fluorine-containing (meth)acrylate copolymer is not particularly limited, and is preferably 2,000,000, more preferably 1,200,000.

The weight average molecular weight can be adjusted by polymerization conditions (e.g., type or amount of a polymerization initiator, polymerization temperature, monomer concentration).

For synthesis of the fluorine-containing (meth)acrylate copolymer, an acrylic monomer from which the above constitutional unit is derived may be radically reacted in the presence of a polymerization initiator. The polymerization method is not particularly limited and a conventionally known method may be employed. Examples thereof include solution polymerization (boiling point polymerization or constant temperature polymerization), emulsion polymerization, suspension polymerization, and bulk polymerization. In particular, preferred is solution polymerization because the synthesis is easy.

In the case of employing solution polymerization as a polymerization method, examples of a reaction solvent include ethyl acetate, toluene, methyl ethyl ketone, methyl sulfoxide, ethanol, acetone, and diethyl ether. These reaction solvents may be used alone or in combination of two or more thereof.

The polymerization initiator is not particularly limited, and examples thereof include organic peroxides and azo compounds.

Examples of the organic peroxides include 1,1-bis(t-hexylperoxy)-3,3,5-trimethylcyclohexane, t-hexylperoxypivalate, t-butylperoxypivalate, 2,5-dimethyl-2,5-bis(2-ethylhexanoylperoxy)hexane, t-hexylperoxy-2-ethylhexanoate, t-butylperoxy-2-ethylhexanoate, t-butylperoxyisobutyrate, t-butylperoxy-3,5,5-trimethylhexanoate, and t-butylperoxylaurate. Examples of the azo compounds include azobisisobutyronitrile and azobiscyclohexanecarbonitrile. These polymerization initiators may be used alone or in combination of two or more thereof.

The acrylic adhesive containing a fluorine-containing (meth)acrylate copolymer preferably contains a crosslinking agent. In the case where the fluorine-containing (meth)acrylate copolymer has the constitutional unit derived from a monomer having a crosslinkable functional group, addition of a crosslinking agent enables construction of a crosslinking structure.

The crosslinking agent is not particularly limited and examples thereof include isocyanate crosslinking agents, aziridine crosslinking agents, epoxy crosslinking agents, and metal chelate crosslinking agents. Preferred among these are isocyanate crosslinking agents and epoxy crosslinking agents. In the case where the adhesive tape of the present invention is used as a transparent adhesive tape for optical use, the use of an aromatic ring-free crosslinking agent is preferred from the standpoint of weather resistance.

The lower limit of the amount of the crosslinking agent relative to 100 parts by weight of the acrylic adhesive containing the fluorine-containing (meth)acrylate copolymer is preferably 0.01 parts by weight and the upper limit thereof is preferably 10 parts by weight. The lower limit is more preferably 0.1 parts by weight and the upper limit is more preferably 5 parts by weight.

The acrylic adhesive containing a fluorine-containing (meth)acrylate copolymer may contain a silane coupling agent. When the acrylic adhesive containing a fluorine-containing (meth)acrylate copolymer contains a silane coupling agent, adhesiveness to an adherend is enhanced to further enhance the resistance of the adhesive tape against sebum.

The silane coupling agent is not particularly limited and examples thereof include vinyltrimethoxysilane, vinyltriethoxysilane, γ-methacryloxypropyltrimethoxysilane, γ-methacryloxypropylmethyldimethoxysilane, γ-glycidoxypropyltrimethoxysilane, γ-glycidoxypropylmethyldimethoxysilane, γ-glycidoxypropylmethyldiethoxysilane, γ-glycidoxypropyltriethoxysilane, 2-(3,4-epoxycyclohexyl)ethyltrimethoxysilane, γ-aminopropyltrimethoxysilane, γ-aminopropyltriethoxysilane, γ-aminopropyltrimethylmethoxysilane, N-(2-aminoethyl)3-aminopropyltriethoxysilane, N-(2-aminoethyl)3-aminopropylmethyldimethoxysilane, γ-mercaptopropyltrimethoxysilane, γ-mercaptopropyltriethoxysilane, mercaptobutyltrimethoxysilane, and γ-mercaptopropylmethyldimethoxysilane. Preferred among these is γ-glycidoxypropyltriethoxysilane.

The amount of the silane coupling agent is not particularly limited. The lower limit of the amount of the silane coupling agent relative to 100 parts by weight of the acrylic adhesive containing a fluorine-containing (meth)acrylate copolymer is preferably 0.1 parts by weight and the upper limit thereof is preferably 5 parts by weight. With the amount of the silane coupling agent of 0.1 parts by weight or more, the resistance against sebum can be further enhanced. With the amount of 5 parts by weight or less, adhesive deposits upon re-peeling can be suppressed. The lower limit of the amount of the silane coupling agent is more preferably 1 part by weight and the upper limit thereof is more preferably 3 parts by weight.

The acrylic adhesive containing a fluorine-containing (meth)acrylate copolymer may optionally contain additives such as a plasticizer, an emulsifier, a softener, a filler agent, a pigment, and a dye, tackifiers such as a rosin resin and a terpene resin, and other resins.

The adhesive layer formed of the acrylic adhesive containing a fluorine-containing (meth)acrylate copolymer preferably has a gel fraction of 5% or more.

When the adhesive layer formed of the acrylic adhesive containing a fluorine-containing (meth)acrylate copolymer has a gel fraction of 5% or more, adjustment of the swelling ratio within the above range is facilitated. The lower limit of the gel fraction of the adhesive layer formed of the acrylic adhesive containing a fluorine-containing (meth)acrylate copolymer is more preferably 10%, still more preferably 25%, particularly preferably 30%. In particular, in the case where a fluorine-containing (meth)acrylate copolymer containing 30% by weight or more and 40% by weight or less of a constitutional unit derived from a fluorine-containing (meth)acrylate is used, the adhesive layer preferably has a gel fraction of 30% or more. With the gel fraction of 30% or more, adjustment of the swelling ratio of the adhesive layer within the above range is especially facilitated. The upper limit of the gel fraction of the adhesive layer formed of the acrylic adhesive containing a fluorine-containing (meth)acrylate copolymer is not particularly limited, and is preferably 95%, more preferably 90%.

(2) Acrylic Adhesive Containing a (Meth)Acrylate Copolymer Containing a Constitutional Unit Derived from a (Meth)Acrylate Having an Alkyl Group with a Carbon Number of 2 or Less The acrylic adhesive also preferably contains a (meth)acrylate copolymer containing a constitutional unit derived from a (meth)acrylate having an alkyl group with a carbon number of 2 or less (hereinafter, simply referred to as a (meth)acrylate copolymer having an alkyl group with a carbon number of 2 or less). The (meth)acrylate copolymer having an alkyl group with a carbon number of 2 or less has high polarity and high cohesive force and therefore can prevent entrance of sebum into the molecular chain. Accordingly, the adhesive tape to be obtained can have excellent resistance against sebum.

Examples of the (meth)acrylate having an alkyl group with a carbon number of 2 or less include methyl(meth)acrylate and ethyl(meth)acrylate. In particular, preferred is ethyl acrylate because the adhesive is not too hard and can provide an adhesive tape with enhanced adhesive force.

The lower limit of the amount of the constitutional unit derived from a (meth)acrylate having an alkyl group with a carbon number of 2 or less in the (meth)acrylate copolymer having an alkyl group with a carbon number of 2 or less is preferably 80% by weight and the upper limit thereof is preferably 97% by weight. With the amount of the constitutional unit derived from a (meth)acrylate having an alkyl group with a carbon number of 2 or less of 80% by weight or more, the resistance against sebum is further enhanced. With the amount of the constitutional unit derived from a (meth)acrylate having an alkyl group with a carbon number of 2 or less of 97% by weight or less, the adhesive is not too hard and can provide an adhesive tape with enhanced adhesive force. The lower limit of the amount of the constitutional unit derived from a (meth)acrylate having an alkyl group with a carbon number of 2 or less is more preferably 90% by weight and the upper limit thereof is more preferably 95% by weight.

The (meth)acrylate copolymer having an alkyl group with a carbon number of 2 or less preferably further contains a constitutional unit derived from a monomer having a crosslinkable functional group.

When the (meth)acrylate copolymer having an alkyl group with a carbon number of 2 or less contains the constitutional unit derived from a monomer having a crosslinkable functional group, the use of a crosslinking agent in combination allows crosslinking between acrylic adhesive chains. Adjustment of the degree of crosslinking at that time can adjust the gel fraction and the swelling ratio.

Examples of the crosslinkable functional group include hydroxy, carboxy, glycidyl, amino, amide, and nitrile groups. In particular, preferred are hydroxy and carboxy groups because the gel fraction of the adhesive layer is easily adjusted.

Examples of the monomer having a hydroxy group include (meth)acrylic acid esters having a hydroxy group, such as 4-hydroxybutyl(meth)acrylate, and 2-hydroxyethyl (meth)acrylate. Examples of the monomer having a carboxy group include (meth)acrylic acid. Examples of the monomer having a glycidyl group include glycidyl (meth)acrylate. Examples of the monomer having an amide group include hydroxyethylacrylamide, isopropylacrylamide, and dimethylaminopropylacrylamide. Examples of the monomer having a nitrile group include acrylonitrile. These monomers having a crosslinkable functional group may be used alone or in combination of two or more thereof.

The amount of the constitutional unit derived from a monomer having a crosslinkable functional group in the (meth)acrylate copolymer having an alkyl group with a carbon number of 2 or less is not particularly limited. The lower limit thereof is preferably 1% by weight and the upper limit thereof is preferably 5% by weight. With the amount of the constitutional unit derived from a monomer having a crosslinkable functional group falling within the above range, adjustment of the swelling ratio and the gel fraction within the above ranges is facilitated.

The (meth)acrylate copolymer having an alkyl group with a carbon number of 2 or less may further contain, a constitutional unit derived from propyl acrylate, butyl acrylate, cyclohexyl acrylate, octyl acrylate, nonyl acrylate, isobornyl acrylate, benzyl acrylate, phenoxyethyl acrylate, vinyl acetate, or the like, as long as the effect of the present invention is not impaired.

The lower limit of the weight average molecular weight of the (meth)acrylate copolymer having an alkyl group with a carbon number of 2 or less is preferably 200,000 and the upper limit thereof is preferably 2,000,000. With the weight average molecular weight of the (meth)acrylate copolymer having an alkyl group with a carbon number of 2 or less falling within the above range, the adhesive tape to be obtained can have further enhanced adhesive force. The lower limit of the weight average molecular weight of the (meth)acrylate copolymer having an alkyl group with a carbon number of 2 or less is more preferably 250,000 and the upper limit thereof is more preferably 1,200,000. The weight average molecular weight can be adjusted by the polymerization conditions (e.g., type or amount of a polymerization initiator, polymerization temperature, monomer concentration).

The (meth)acrylate copolymer having an alkyl group with a carbon number of 2 or less can be synthesized by any method, and a method similar to the method of synthesizing the fluorine-containing (meth)acrylate copolymer may be employed. The polymerization initiator may also be the same as that used in synthesis of the fluorine-containing (meth)acrylate copolymer.

The acrylic adhesive containing a (meth)acrylate copolymer having an alkyl group with a carbon number of 2 or less preferably contains a crosslinking agent. In the case where the (meth)acrylate copolymer having an alkyl group with a carbon number of 2 or less has the constitutional unit derived from a monomer having a crosslinkable functional group, addition of a crosslinking agent enables construction of a crosslinking structure.

The crosslinking agent is not particularly limited, and examples thereof include isocyanate crosslinking agents, aziridine crosslinking agents, epoxy crosslinking agents, and metal chelate crosslinking agents. Preferred among these are isocyanate crosslinking agents and epoxy crosslinking agents.

The lower limit of the amount of the crosslinking agent relative to 100 parts by weight of the acrylic adhesive containing the (meth)acrylate copolymer having an alkyl group with a carbon number of 2 or less is preferably 0.01 parts by weight and the upper limit thereof is preferably 10 parts by weight. The lower limit thereof is more preferably 0.1 parts by weight and the upper limit thereof is more preferably 5 parts by weight.

The acrylic adhesive containing a (meth)acrylate copolymer having an alkyl group with a carbon number of 2 or less may contain a silane coupling agent. When the acrylic adhesive containing a (meth)acrylate copolymer having an alkyl group with a carbon number of 2 or less contains a silane coupling agent, adhesiveness to an adherend is enhanced to further enhance the resistance of the adhesive tape against sebum.

The type and amount of the silane coupling agent used may be the same as those mentioned for the acrylic adhesive containing a fluorine-containing (meth)acrylate copolymer.

The acrylic adhesive containing a (meth)acrylate copolymer having an alkyl group with a carbon number of 2 or less may optionally contain additives such as a plasticizer, an emulsifier, a softener, a filler agent, a pigment, and a dye, tackifiers such as a rosin resin and a terpene resin, and other resins.

The acrylic adhesive layer containing a (meth)acrylate copolymer having an alkyl group with a carbon number of 2 or less preferably has a gel fraction of 80% or more.

When the acrylic adhesive layer containing a (meth) acrylate copolymer having an alkyl group with a carbon number of 2 or less has a gel fraction of 80% or more, adjustment of the swelling ratio within the above range is facilitated. The lower limit of the gel fraction of the acrylic adhesive layer containing a (meth)acrylate copolymer having an alkyl group with a carbon number of 2 or less is more preferably 90%. The upper limit of the gel fraction of the acrylic adhesive layer containing a (meth)acrylate copolymer having an alkyl group with a carbon number of 2 or less is not particularly limited, and is preferably 98%, more preferably 95%.

The thickness of the adhesive layer is not particularly limited. The lower limit of the thickness of the adhesive layer is preferably 5 μm and the upper limit thereof is preferably 50 μm. With the thickness of the adhesive layer of 5 μm or more, the adhesive tape to be obtained has further enhanced adhesiveness. With the thickness of the adhesive layer of 50 μm or less, the adhesive tape to be obtained has further enhanced processability.

The adhesive tape of the present invention may be a supported type adhesive tape including a substrate or a non-supported type adhesive tape including no substrate. In the case of the supported type, the adhesive layer may be formed on one surface or each surface of the substrate.

The substrate is not particularly limited, and examples thereof include polyolefin resin films (e.g., polyethylene films, polypropylene films), polyester resin films (e.g., PET films), ethylene-vinyl acetate copolymer films, polyvinyl chloride resin films, polyurethane resin films, polyolefin foam sheets (e.g., polyethylene foam sheets, polypropylene foam sheets), and polyurethane foam sheets. Preferred among these substrates are PET films. From the standpoint of the impact resistance, preferred are polyolefin foam sheets.

Also usable as the substrate are substrates printed black for preventing light transmission, substrates printed white for improving light reflection, and metalized substrates.

The adhesive tape of the present invention may be produced by any method. In the case where the adhesive tape of the present invention is a two-sided adhesive tape including a substrate, for example, the following method may be employed.

First, a solvent is added to a (meth)acrylate copolymer and, if needed, a crosslinking agent and the like, thereby preparing a solution of an acrylic adhesive a. The solution of an acrylic adhesive a is applied to the surface of a substrate, and the solvent in the solution is completely dried to be removed. Thus, an adhesive layer a is formed. Next, a release film is placed on the adhesive layer a in such a manner that the release-treated surface of the release film faces the adhesive layer a. Then, another release film is prepared and to the release-treated surface of the release film is applied a solution of an acrylic adhesive b. A solvent in the solution is completely dried to be removed. Thus, a laminated film including a release film and an adhesive layer b formed on the surface of the release film is produced. The obtained laminated film is placed on the rear surface of the substrate having the adhesive layer a formed thereon in such a manner that the adhesive layer b faces the rear surface of the substrate. Thus, a laminate is produced. The laminate is pressurized using a rubber roller or the like to provide an adhesive tape including a substrate and an adhesive layer on each surface of the substrate, in which the surface of each adhesive layer is covered with a release film.

In another method, two laminated films are produced in the same manner, and the laminated films are placed on each surface of a substrate in such a manner that the adhesive layer of each laminated film faces the substrate, thereby preparing a laminate. The laminate is pressurized using a rubber roller or the like to provide an adhesive tape including a substrate and an adhesive layer on each surface of the substrate, in which the surface of each adhesive layer is covered with a release film.

The application of the adhesive tape of the present invention is not particularly limited. Owing to excellent resistance against sebum, the adhesive tape of the present invention is particularly suitably used for fixation of a component of an electronic device frequently touched with human hands. Specifically, the adhesive tape of the present invention is favorably used for fixation of a touch panel part in a portable electronic device such as smartphones or tablet terminals or for fixation of a display panel part in an in-vehicle electronic device such as car navigation systems.

The present invention also encompasses an adhesive tape for fixing electronic device component provided with the adhesive tape of the present invention.

The adhesive tape of the present invention is also suitably used as a transparent adhesive tape for optical use for bonding components in production of a polarizer or the like, for bonding a display panel and a protective plate that protects the surface of an image display device, and for bonding a display panel and a glass plate, a polycarbonate plate, or acrylic plate of a touch panel in production of an image display device such as mobile phones, smartphones, and tablet terminals. In the case where the adhesive tape of the present invention is used as a transparent adhesive tape for optical use, a non-supported type adhesive tape including no substrate is preferred because higher optical properties can be achieved.

The present invention also encompasses a transparent adhesive tape for optical use provided with the adhesive tape of the present invention.

The shape of the adhesive tape of the present invention is not particularly limited, and may be a rectangular shape. Preferred is a frame shape because such a shape is suitable for fixation of a touch panel or the like as mentioned above. In addition, since the adhesive tape of the present invention can maintain high adhesive force even when applied to a part frequently touched with human hands, the adhesive tape can be suitably used even when the width thereof is narrow.

Advantageous Effects of Invention

The present invention can provide an adhesive tape excellent in resistance against sebum to be able to maintain its adhesive force even when applied to a part frequently touched with human hands, and an adhesive tape for fixing electronic device component and a transparent adhesive tape for optical use each provided with the adhesive tape.

DESCRIPTION OF EMBODIMENTS

The present invention is more specifically described in the following with reference to, but not limited to, examples.

Example 1

(1) Production of a (Meth)Acrylate Copolymer

A reaction vessel was charged with ethyl acetate as a polymerization solvent, and the ethyl acetate was bubbled with nitrogen. The reaction vessel was heated while nitrogen was flowed thereinto, thereby starting reflux. Subsequently, to the reaction vessel was charged a polymerization initiator solution prepared by diluting 0.1 parts by weight of azobisisobutyronitrile, as a polymerization initiator, 10 times with ethyl acetate. Then, 63.5 parts by weight of butyl acrylate, 33.5 parts by weight of 2,2,2-trifluoroethylacrylate, and 3 parts by weight of acrylic acid were dropwise added over two hours. After the dropwise addition, the polymerization initiator solution prepared by diluting 0.1 parts by weight of azobisisobutyronitrile, as a polymerization initiator, 10 times with ethyl acetate was again added to the reaction vessel, and the polymerization reaction was allowed to proceed for four hours. Thus, a (meth)acrylate copolymer-containing solution was obtained.

(2) Production of an Adhesive Tape

To the obtained (meth)acrylate copolymer-containing solution was added TETRAD-C (Mitsubishi Gas Chemical Company), as an epoxy crosslinking agent, in an amount of 1 part by weight relative to 100 parts by weight of the (meth)acrylate copolymer-containing solution. The mixed solution was applied to a release-treated PET film having a thickness of 75 μm such that the dried adhesive layer had a thickness of 35 μm, followed by drying at 110° C. for five minutes. This adhesive layer was transferred to a corona-treated PET film having a thickness of 50 μm as a substrate, and then allowed to stand at 40° C. for 48 hours. Thus, an adhesive tape was obtained.

(3) Measurement of Gel Fraction

A plane rectangular test piece (20 mm×40 mm) was cut out from the obtained adhesive tape, and the weight thereof was measured. The test piece was immersed in ethyl acetate at 23° C. for 24 hours, taken out from the ethyl acetate, and dried at 110° C. for one hour. The weight of the dried test piece was measured, and the gel fraction was calculated using the following equation (1):

$$\text{Gel fraction (\% by weight)} = 100 \times (W2 - W0)/(W1 - W0) \quad (1)$$

(W0: weight of substrate, W1: weight of test piece before immersion, W2: weight of test piece after immersion and drying).

(4) Measurement of Oleic Acid Swelling Ratio

A plane rectangular test piece (20 mm×40 mm) was cut out from the obtained adhesive tape, and the weight thereof was measured. The test piece was immersed in oleic acid under the conditions of a temperature of 60° C. and a humidity of 90% for 24 hours, and taken out from the oleic acid. The surface of the test piece was washed with ethanol. Then, the test piece was dried at 110° C. for three hours. The weight of the dried test piece was measured, and the oleic acid swelling ratio of the acrylic adhesive was calculated using the following equation (2):

$$\text{Swelling ratio (\% by weight)} = 100 \times (W5 - W3)/(W4 - W3) \quad (2)$$

(W3: weight of substrate, W4: weight of test piece before immersion in oleic acid, W5: weight of test piece after immersion in oleic acid and drying).

Examples 2 to 20, Comparative Examples 1 to 5

Adhesive tapes were obtained in the same manner as in Example 1, except that the types and amounts of the monomer and crosslinking agent to be used were changed as shown in Tables 1 to 4, and the gel fraction and the oleic acid swelling ratio of each were measured.

Coronate L-45 in the tables is an isocyanate crosslinking agent available from Tosoh Corporation.

Example 21

A reaction vessel was charged with 99 parts by weight of 2,2,3,3,3-pentafluoropropylacrylate, 0.5 parts by weight of acrylic acid, and 0.1 parts by weight of product name "IRGACURE 651" available from Ciba Specialty Chemicals Inc. as a photopolymerization initiator. The contents were bubbled with nitrogen, and then irradiated with UV light until the viscosity (BH viscometer No. 5 rotor, 10 rpm, measurement temperature of 30° C.) reached about 8,000 mPa·s, while nitrogen was flowed into the reaction vessel. Then, 0.5 parts by weight of trimethylolpropanetriacrylate (Tokyo Chemical Industry Co., Ltd.) was added thereto. Thus, a composition for forming an adhesive layer was prepared.

The obtained composition for forming an adhesive layer was applied to a polyethylene terephthalate (PET) film having a thickness of 75 μm such that the dried adhesive layer had a thickness of 35 μm, and attached to a corona-treated PET film having a thickness of 50 μm serving as a substrate, thereby preparing a laminated sheet. The obtained laminated sheet was irradiated with UV light at an illuminance of 5 mW/cm² from the substrate PET film side for five minutes using a black light (Toshiba Corporation). Thus, an adhesive tape was obtained.

The gel fraction and the oleic acid swelling ratio of the obtained adhesive tape were measured in the same manner as in Example 1.

Example 22

A (meth)acrylate copolymer-containing solution was obtained in the same manner as in Example 1, except that the types and amounts of the monomer and crosslinking agent used were set as shown in Table 5.

To the obtained (meth)acrylate copolymer-containing solution were added TETRAD-C (Mitsubishi Gas Chemical Company) as an epoxy crosslinking agent in an amount of 0.1 parts by weight relative to 100 parts by weight of the (meth)acrylate copolymer-containing solution. The resulting solution was applied to a release-treated PET film having a thickness of 75 μm such that the dried adhesive layer had a thickness of 15 μm, and dried at 110° C. for five minutes. Another release-treated PET film having a thickness of 75 μm was attached to sandwich the adhesive layer, and the resulting laminate was allowed to stand at 40° C. for 48 hours. Thus, a non-supported type adhesive tape including no substrate was obtained.

The gel fraction and the oleic acid swelling ratio of the obtained adhesive tape were measured in the same manner as in Example 1.

A 15 mm×15 mm piece was cut out from the obtained adhesive tape, and the release film on each surface was peeled. The one surface of the adhesive tape was attached to a glass plate, thereby obtaining a measurement sample. The total light transmittance of the obtained measurement sample was measured with "Haze Meter NDH4000" available from Nippon Denshoku Industries Co., Ltd., and was 99%. The Haze value was 0.23%. The Y value of the sample was measured with "SPECTROPHOTOMETER CM-3700d" available from Konica Minolta, Inc., and was 0.245. The L* coordinate was 99.7, the a* coordinate was 0, and the b* coordinate was 0.02. These optical properties show that the obtained adhesive tape exhibits sufficient performance as a transparent adhesive tape for optical use.

(Evaluation)

The adhesive tapes obtained in the examples and comparative examples were evaluated for the following parameters. Tables 1 to 5 show the results.

(1) Measurement of 180° Peel Adhesive Force

A rectangular test piece having a width of 10 mm was cut out from the obtained adhesive tape, and one release film was peeled from the test piece to expose the adhesive layer. The test piece was placed on a stainless-steel plate in such a manner that the adhesive layer faces the stainless-steel plate. The test piece was bonded to the stainless-steel plate by one reciprocating motion of a 2-kg rubber roller on the test piece at a rate of 300 mm/min, and then allowed to stand at 23° C. for 24 hours. Thus, a test sample was prepared. The test sample was heated in an oven under the conditions of a temperature of 60° C. and a humidity of 90% for 100 hours, allowed to stand at 23° C. for 24 hours, and subjected to a tensile test in a 180° direction at a peel rate of 300 mm/min in conformity with JIS 20237. Thus, the 180° peel adhesive force (N/mm) before immersion in oleic acid was measured.

In Example 22, after bonding of the test piece to the stainless-steel plate, the other release film was peeled off to expose the adhesive layer, and a PET film having a thickness of 50 μm was attached thereto. The laminate was allowed to stand at 23° C. for 24 hours, thereby preparing a test sample.

The test sample was immersed in an oleic acid bath under the conditions of a temperature of 60° C. and a humidity of 90% for 100 hours, taken out from the bath, washed with water, and allowed to stand for 24 hours. The resulting test sample was subjected to the above peel test. Thus, the 180° peel adhesive force after immersion in oleic acid was measured.

Based on the 180° peel adhesive force of a blank test sample and the 180° peel adhesive force of the test sample after immersion in oleic acid, the residual adhesive force ratio (%) was calculated using the following equation (3). The case where the residual adhesive force ratio was 20% or higher or the 180° peel adhesive force after immersion in oleic acid was 0.2 N/mm or more was rated "∘∘ (Excellent)". The case where the residual adhesive force ratio was 5% or higher or the 180° peel adhesive force after immersion in oleic acid was 0.04 N/mm or more was rated "∘ (Good)". The case where the residual adhesive force ratio was lower than 5% was rated "x (Poor)".

Residual adhesive force ratio (%)=(180° peel adhesive force after immersion in oleic acid/180° peel adhesive force before immersion in oleic acid)×100   (3)

(2) Evaluation of Tackiness

The adhesive surface of the produced adhesive tape was touched with a hand, and tackiness of the adhesive tape was evaluated by sensory evaluation. The tackiness was evaluated on a four-point scale where the tackiness of Example 18 was taken as "slight tackiness" and the tackiness of Comparative Example 1 was taken as "high tackiness".
1: slight tackiness, 2: low tackiness, 3: medium tackiness, 4: high tackiness

TABLE 1

| | | | Example 1 | Example 2 | Example 3 | Example 4 |
|---|---|---|---|---|---|---|
| Acrylic adhesive | Monomer composition of (meth)acrylate copolymer [parts by weight] | Methyl acrylate | 0 | 0 | 0 | 0 |
| | | Ethyl acrylate | 0 | 0 | 33.5 | 23.5 |
| | | Butyl acrylate | 63.5 | 47 | 33.5 | 23.5 |
| | | 2-Ethylhexylacrylate | 0 | 0 | 0 | 0 |
| | | 2,2,2-trifluoroethylacrylate | 33.5 | 50 | 30 | 50 |
| | | 2-(perfluorohexyl)ethylacrylate | 0 | 0 | 0 | 0 |
| | | 2,2,3,3,3-pentafluoropropylacrylate | 0 | 0 | 0 | 0 |
| | | Acrylic acid | 3 | 3 | 3 | 3 |
| | | Weight average molecular weight | 1020000 | 1040000 | 1200000 | 1090000 |
| | Crosslinking agent [parts by weight] | TETRAD-C | 1 | 1 | 1 | 1 |
| | | Coronate L-45 | 0 | 0 | 0 | 0 |
| | Thickness of adhesive layer [μm] | | 35 | 35 | 35 | 35 |
| | Gel fraction [%] | | 88 | 92 | 92 | 93 |
| | Oleic acid swelling ratio [%] | | 125 | 118 | 106 | 108 |
| Evaluation | 180° peel adhesive force | Before immersion in oleic acid [N/mm] | 0.93 | 0.99 | 0.92 | 1.19 |
| | | After immersion in oleic acid [N/mm] | 0.05 | 0.09 | 0.21 | 0.40 |
| | | Residual adhesive force ratio [%] | 5.4 | 8.8 | 22.8 | 34.0 |
| | Judgement | | ∘ | ∘ | ∘∘ | ∘∘ |
| | Tackiness | | 3 | 3 | 2 | 2 |

| | | | Example 5 | Example 6 | Example 7 | Example 8 |
|---|---|---|---|---|---|---|
| Acrylic adhesive | Monomer composition of (meth)acrylate copolymer [parts by weight] | Methyl acrylate | 0 | 0 | 0 | 0 |
| | | Ethyl acrylate | 0 | 23.5 | 23.5 | 0 |
| | | Butyl acrylate | 47 | 23.5 | 23.5 | 17 |
| | | 2-Ethylhexylacrylate | 0 | 0 | 0 | 0 |
| | | 2,2,2-trifluoroethylacrylate | 0 | 0 | 0 | 0 |
| | | 2-(perfluorohexyl)ethylacrylate | 50 | 50 | 50 | 0 |
| | | 2,2,3,3,3-pentafluoropropylacrylate | 0 | 0 | 0 | 80 |
| | | Acrylic acid | 3 | 3 | 3 | 3 |
| | | Weight average molecular weight | 690000 | 960000 | 750000 | 950000 |
| | Crosslinking agent [parts by weight] | TETRAD-C | 0.2 | 0.2 | 0.2 | 0.2 |
| | | Coronate L-45 | 0 | 0 | 0 | 0 |
| | Thickness of adhesive layer [μm] | | 35 | 35 | 35 | 35 |
| | Gel fraction [%] | | 66 | 82 | 42 | 91 |
| | Oleic acid swelling ratio [%] | | 112 | 102 | 105 | 102 |
| Evaluation | 180° peel adhesive force | Before immersion in oleic acid [N/mm] | 0.88 | 1.21 | 1.24 | 0.84 |
| | | After immersion in oleic acid [N/mm] | 0.13 | 0.33 | 0.33 | 0.16 |
| | | Residual adhesive force ratio [%] | 14.7 | 27.6 | 26.7 | 18.5 |
| | Judgement | | ∘ | ∘∘ | ∘∘ | ∘ |
| | Tackiness | | 3 | 2 | 2 | 2 |

TABLE 2

| | | | Example 9 | Example 10 | Example 11 | Example 12 | Example 13 |
|---|---|---|---|---|---|---|---|
| Acrylic adhesive | Monomer composition of (meth)acrylate copolymer [parts by weight] | Methyl acrylate | 0 | 0 | 0 | 0 | 0 |
| | | Ethyl acrylate | 0 | 0 | 0 | 0 | 0 |
| | | Butyl acrylate | 67 | 67 | 59 | 57 | 57 |
| | | 2-Ethylhexylacrylate | 0 | 0 | 0 | 0 | 0 |
| | | 2,2,2-trifluoroethylacrylate | 30 | 30 | 38 | 40 | 40 |
| | | 2-(perfluorohexyl)ethylacrylate | 0 | 0 | 0 | 0 | 0 |
| | | 2,2,3,3,3-pentafluoropropylacrylate | 0 | 0 | 0 | 0 | 0 |
| | | Acrylic acid | 3 | 3 | 3 | 3 | 3 |
| | | Weight average molecular weight | 1100000 | 1100000 | 1000000 | 1120000 | 1120000 |

TABLE 2-continued

|  |  |  |  |  |  |  |  |
|---|---|---|---|---|---|---|---|
|  | Crosslinking agent | TETRAD-C | 1 | 0.05 | 0.3 | 1 | 0.1 |
|  | [parts by weight] | Coronate L-45 | 0 | 0 | 0 | 0 | 0 |
|  | Thickness of adhesive layer [μm] |  | 35 | 35 | 35 | 35 | 35 |
|  | Gel fraction [%] |  | 89 | 12 | 35 | 91 | 18 |
|  | Oleic acid swelling ratio [%] |  | 128 | 129 | 122 | 119 | 120 |
| Evaluation | 180° peel adhesive force | Before immersion in oleic acid [N/mm] | 0.74 | 0.80 | 0.88 | 0.90 | 0.96 |
|  |  | After immersion in oleic acid [N/mm] | 0.05 | 0.04 | 0.06 | 0.08 | 0.12 |
|  |  | Residual adhesive force ratio [%] | 6.8 | 5.0 | 6.8 | 8.9 | 12.5 |
|  |  | Judgement | ○ | ○ | ○ | ○ | ○ |
|  |  | Tackiness | 3 | 3 | 3 | 3 | 3 |

|  |  |  | Example 14 | Example 15 | Example 16 | Example 17 |
|---|---|---|---|---|---|---|
| Acrylic adhesive | Monomer composition of (meth)acrylate copolymer [parts by weight] | Methyl acrylate | 0 | 0 | 0 | 0 |
|  |  | Ethyl acrylate | 0 | 0 | 0 | 0 |
|  |  | Butyl acrylate | 57 | 57 | 47 | 17 |
|  |  | 2-Ethylhexylacrylate | 0 | 0 | 0 | 0 |
|  |  | 2,2,2-trifluoroethylacrylate | 40 | 0 | 0 | 0 |
|  |  | 2-(perfluorohexyl)ethylacrylate | 0 | 40 | 50 | 0 |
|  |  | 2,2,3,3,3-pentafluoropropylacrylate | 0 | 0 | 0 | 80 |
|  |  | Acrylic acid | 3 | 3 | 3 | 3 |
|  |  | Weight average molecular weight | 250000 | 280000 | 450000 | 950000 |
|  | Crosslinking agent [parts by weight] | TETRAD-C | 1 | 0.1 | 0.1 | 0 |
|  |  | Coronate L-45 | 0 | 0 | 0 | 1 |
|  | Thickness of adhesive layer [μm] |  | 35 | 35 | 35 | 35 |
|  | Gel fraction [%] |  | 45 | 12 | 15 | 60 |
|  | Oleic acid swelling ratio [%] |  | 126 | 128 | 122 | 102 |
| Evaluation | 180° peel adhesive force | Before immersion in oleic acid [N/mm] | 0.96 | 0.79 | 0.85 | 0.88 |
|  |  | After immersion in oleic acid [N/mm] | 0.05 | 0.04 | 0.11 | 0.20 |
|  |  | Residual adhesive force ratio [%] | 5.2 | 5.1 | 12.9 | 22.7 |
|  |  | Judgement | ○ | ○ | ○ | ○○ |
|  |  | Tackiness | 3 | 3 | 3 | 2 |

TABLE 3

|  |  |  | Example 18 | Example 19 | Example 20 |
|---|---|---|---|---|---|
| Acrylic adhesive | Monomer composition of (meth)acrylate copolymer [parts by weight] | Methyl acrylate | 0 | 0 | 60 |
|  |  | Ethyl acrylate | 97 | 90 | 20 |
|  |  | Butyl acrylate | 0 | 7 | 17 |
|  |  | 2-Ethylhexylacrylate | 0 | 0 | 0 |
|  |  | 2,2,2-trifluoroethylacrylate | 0 | 0 | 0 |
|  |  | 2-(perfluorohexyl)ethylacrylate | 0 | 0 | 0 |
|  |  | 2,2,3,3,3-pentafluoropropylacrylate | 0 | 0 | 0 |
|  |  | Acrylic acid | 3 | 3 | 3 |
|  |  | Weight average molecular weight | 280000 | 510000 | 580000 |
|  | Crosslinking agent [parts by weight] | TETRAD-C | 1 | 1 | 1 |
|  |  | Coronate L-45 | 0 | 0 | 0 |
| Thickness of adhesive layer [μm] |  |  | 35 | 35 | 35 |
| Gel fraction [%] |  |  | 96 | 92 | 85 |
| Oleic acid swelling ratio [%] |  |  | 125 | 129 | 125 |
| Evaluation | 180° peel adhesive force | Before immersion in oleic acid [N/mm] | 1.09 | 1.02 | 0.82 |
|  |  | After immersion in oleic acid [N/mm] | 0.31 | 0.29 | 0.22 |
|  |  | Residual adhesive force ratio [%] | 28.1 | 28.4 | 26.9 |
|  |  | Judgement | ○○ | ○○ | ○○ |
| Tackiness |  |  | 1 | 1 | 1 |

TABLE 4

|  |  |  | Comparative Example 1 | Comparative Example 2 | Comparative Example 3 | Comparative Example 4 | Comparative Example 5 |
|---|---|---|---|---|---|---|---|
| Acrylic adhesive | Monomer composition of (meth)acrylate copolymer [parts by weight] | Methyl acrylate | 0 | 0 | 0 | 0 | 0 |
|  |  | Ethyl acrylate | 0 | 0 | 58.5 | 0 | 0 |
|  |  | Butyl acrylate | 97 | 0 | 38.5 | 68.5 | 47 |
|  |  | 2-Ethylhexylacrylate | 0 | 97 | 0 | 0 | 0 |
|  |  | 2,2,2-trifluoroethylacrylate | 0 | 0 | 0 | 28.5 | 0 |
|  |  | 2-(perfluorohexyl)ethylacrylate | 0 | 0 | 0 | 0 | 50 |
|  |  | 2,2,3,3,3-pentafluoropropylacrylate | 0 | 0 | 0 | 0 | 0 |
|  |  | Acrylic acid | 3 | 3 | 3 | 3 | 3 |
|  |  | Weight average molecular weight | 1040000 | 1070000 | 670000 | 1120000 | 100000 |

TABLE 4-continued

|  |  |  | Comparative Example 1 | Comparative Example 2 | Comparative Example 3 | Comparative Example 4 | Comparative Example 5 |
|---|---|---|---|---|---|---|---|
|  | Crosslinking agent [parts by weight] | TETRAD-C | 1 | 1 | 1 | 1 | 0.1 |
|  |  | Coronate L-45 | 0 | 0 | 0 | 0 | — |
|  | Thickness of adhesive layer [μm] |  | 35 | 35 | 35 | 35 | 35 |
|  | Gel fraction [%] |  | 97 | 93 | 92 | 92 | 10 |
|  | Oleic acid swelling ratio [%] |  | 238 | 215 | 160 | 134 | 180 |
| Evaluation | 180° peel adhesive force | Before immersion in oleic acid [N/mm] | 0.67 | 0.76 | 0.78 | 0.80 | 0.51 |
|  |  | After immersion in oleic acid [N/mm] | 0.001 | 0.001 | 0.001 | 0.003 | 0.001 |
|  |  | Residual adhesive force ratio [%] | 0.2 | 0.1 | 0.2 | 0.3 | 0.2 |
|  |  | Judgement | x | x | x | x | x |
|  | Tackiness |  | 4 | 4 | 3 | 2 | 3 |

TABLE 5

|  |  |  | Example 21 | Example 22 |
|---|---|---|---|---|
| Acrylic adhesive | Monomer composition of (meth)acrylate copolymer [parts by weight] | Methyl acrylate | 0 | 0 |
|  |  | Ethyl acrylate | 0 | 23.5 |
|  |  | Butyl acrylate | 0 | 23.5 |
|  |  | 2-Ethylhexylacrylate | 0 | 0 |
|  |  | 2,2,2-trifluoroethylacrylate | 0 | 0 |
|  |  | 2-(perfluorohexyl)ethylacrylate | 0 | 50 |
|  |  | 2,2,3,3,3-pentafluoropropylacrylate | 99 | 0 |
|  |  | Acrylic acid | 0.5 | 3 |
|  |  | Trimethyrolpropane triacrylate | 0.5 | 0 |
|  |  | Weight average molecular weight | 1800000 | 960000 |
|  | Crosslinking agent [parts by weight] | TETRAD-C | 0 | 0.1 |
|  |  | Coronate L-45 | 0 | 0 |
|  | Thickness of adhesive layer [μm] |  | 35 | 15 |
|  | Gel fraction [%] |  | 98 | 60 |
|  | Oleic acid swelling ratio [%] |  | 100 | 103 |
| Evaluation | 180° peel adhesive force | Before immersion in oleic acid [N/mm] | 0.25 | 0.89 |
|  |  | After immersion in oleic acid [N/mm] | 0.18 | 0.26 |
|  |  | Residual adhesive force ratio [%] | 72.0 | 29.2 |
|  |  | Judgement | ◯◯ | ◯◯ |
|  | Tackiness |  | 2 | 2 |

INDUSTRIAL APPLICABILITY

The present invention can provide an adhesive tape excellent in resistance against sebum to be able to maintain its adhesive force even when applied to a part frequently touched with human hands, and an adhesive tape for fixing electronic device component and a transparent adhesive tape for optical use each provided with the adhesive tape.

The invention claimed is:

1. An adhesive tape comprising
an adhesive layer comprising an acrylic adhesive comprising a (meth)acrylate copolymer comprising 30% by weight or more and 99% by weight or less of a constitutional unit derived from a fluorine-containing (meth)acrylate, wherein the (meth)acrylate copolymer has a weight average molecular weight of 250,000 or more,
wherein the adhesive layer has a swelling ratio of 100% or more and 130% or less after immersion in oleic acid under the conditions of a temperature of 60° C. and a humidity of 90% for 24 hours.

2. The adhesive tape according to claim 1,
wherein the amount of the constitutional unit derived from a fluorine-containing (meth)acrylate in the (meth)acrylate copolymer is 40% by weight or more.

3. The adhesive tape according to claim 1,
wherein the amount of the constitutional unit derived from a fluorine-containing (meth)acrylate in the (meth)acrylate copolymer is 40% by weight or more and 80% by weight or less.

4. The adhesive tape according to claim 1,
wherein the adhesive layer has a gel fraction of 30% or more.

5. The adhesive tape according to claim 1,
wherein the (meth)acrylate copolymer further comprises a constitutional unit derived from a (meth)acrylate having an alkyl group with a carbon number of 2 or less.

6. An adhesive tape for fixing electronic device component comprising the adhesive tape according to claim 1.

7. A transparent adhesive tape for optical use comprising the adhesive tape according to claim 1.

* * * * *